Figure 1:
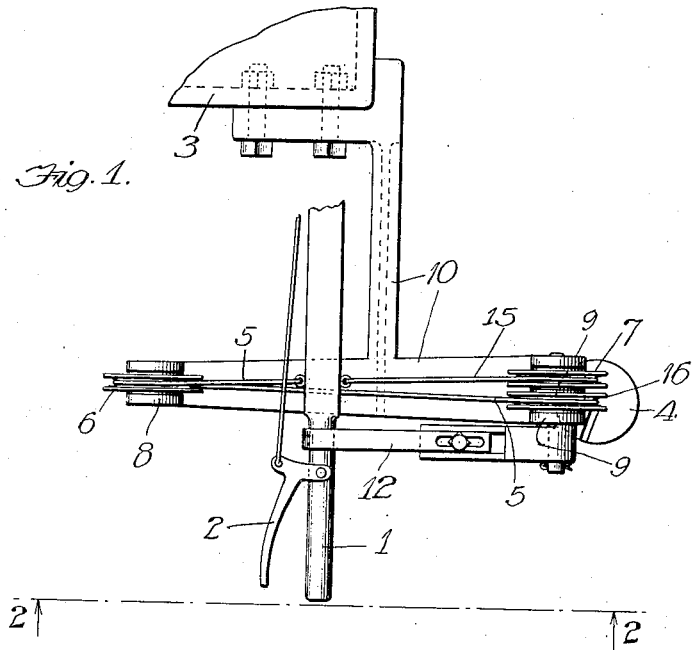

E. M. BASSLER.
ELECTRICAL WELDING MACHINE.
APPLICATION FILED OCT. 6, 1919.

1,338,762.  Patented May 4, 1920.

Witness
Martin H. Olsen.

Inventor
Edwin M. Bassler
By Jur. E. Waldo
Atty.

UNITED STATES PATENT OFFICE.

EDWIN M. BASSLER, OF MILWAUKEE, WISCONSIN.

ELECTRICAL WELDING-MACHINE.

1,338,762.    Specification of Letters Patent.    Patented May 4, 1920.

Application filed October 6, 1919. Serial No. 328,767.

*To all whom it may concern:*

Be it known that I, EDWIN M. BASSLER, a citizen of the United States, and resident of Milwaukee, in the county of Milwaukee and State of Wisconsin, have invented a new and useful Improvement in Electrical Welding-Machines, of which the following is a specification.

This invention relates to improvements in electrical welding machines, and relates particularly to improvements in electrical welding machines especially designed and adapted for butt welding rods, bars, pipes, tubes and the like, in which the pieces to be welded are forced together during the welding operation by hand or foot power applied by the machine operator, usually by means of a lever provided for the purpose.

The improvements forming the present invention are particularly designed and especially adapted for use on electrical welding machines known to the trade as Federal welders, manufactured by The Federal Machine and Welder Company, of Warren, Ohio, specifically to Federal butt welders No. 6-A.

In the use of machines of the type specified—that is, in which the welding pressure is applied by hand or foot power—it is found in practice that a great many imperfect and defective welds are produced as a result of lack of uniformity of the welding pressure, too great pressure forcing the ends of the pieces which are being welded together before they are heated to a proper welding temperature, and too little pressure often resulting in burning the pieces being welded before the weld is made. In any case a defective joint results.

In this connection, it may be mentioned that different pressures are required for welding pieces of different size in cross section; for welding bars and pipes and tubing; and also for welding pipes and tubing of different gage. While experience in operating the machines will enable the machine operator to produce a larger percentage of good welds, results are always dependent upon the personal judgment and physical condition of the operator, and, regardless of his experience and skill, a large percentage of poor welds results. As a considerable pressure is always required, it is obvious that an operator working a machine all day will tire as the day advances, and that, as he becomes tired, it will require greater effort to produce the proper welding pressure than at the beginning of the day's work, when the operator is fresh, thereby further impairing his judgment of the amount of force exerted by him and introducing a further element of uncertainty in the welding operation which experience has shown, results in producing a high percentage of defective welds or joints.

The object of the present invention is to eliminate the factor of the operator's judgment and condition in the application of the welding pressure, and, in place of applying the pressure by hand or foot power, as heretofore, to provide pressure means adapted for applying a uniform welding pressure of the exact strength required, to the parts or pieces to be welded, until they attain the proper welding temperature, said pressure means being so constructed and arranged that the pressure may be varied quickly and conveniently to adapt the machine for welding pieces—as bars, rods, plates, pipes, tubes, etc.—which require different welding pressures.

To this end, my improved pressure means comprises a weight or its equivalent applied to the pressure lever of the machine in such manner as to provide a uniform welding pressure so constructed and arranged that the welding pressure may be quickly and conveniently varied to meet different operating conditions, together with means for relieving the operating lever from the tension of said weight.

Figure 2:
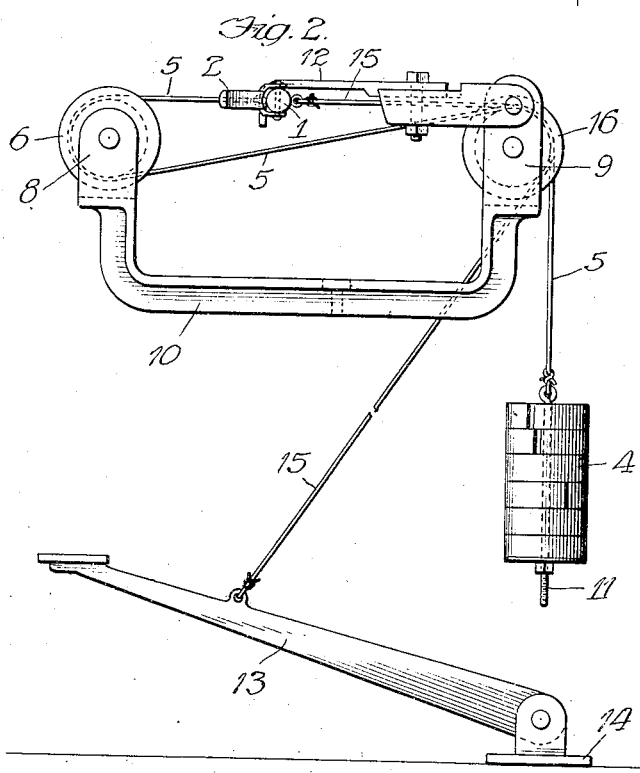

In the accompanying drawings, in which my invention is fully illustrated,

Figure 1 is a top plan view of my improved pressure means, shown in connection with the pressure lever of a Federal butt welding machine and a portion of the frame thereof, on which parts of my improved pressure means are supported; and Fig. 2 is an elevation thereof taken from the position 2—2 of Fig. 1.

Referring now to the drawings, 1 designates the operating lever of a Federal welder No. 6-A, for forcing the ends of the pieces to be welded together, 2 the lever for closing the electric contacts of the machine, and 3 a portion of the frame of said machine on which parts of my improved pressure means are supported. The pressure lever 1 is adapted for manual operation and the lever 2 is pivoted thereto and is adapted to be operated by the grip of the hand used for operating the lever 1.

Welding machines of the type specified are old and well known in the art and can, in fact, be purchased in the open market.

The present invention relates solely to means for operating the pressure lever 1 and has no relation whatever to the specific construction of the machine. For this reason, it is deemed unnecessary to show or describe said machine or the parts thereof other than those in connection with which my invention is to be used, to-wit, the pressure lever 1 and the contact operating lever 2, and so much of the frame of the machine as will illustrate the manner in which my improved pressure means are supported.

In accordance with my invention, desired pressure is adapted to be applied to the pieces to be welded by means of a weight applied to the pressure lever 1. As shown, said weight, designated 4, is applied to the lever 2 by means of a cord 5 attached to the lever 1 and which passes over guide sheaves 6 and 7 rotatably mounted in bearing lugs 8 and 9 formed on a bracket 10 bolted or otherwise rigidly secured to the machine frame 3.

Said weight 4 will be proportioned so as to produce the exact pressure required for welding pieces of any desired shape and size and can be readily ascertained by experiment. Having ascertained the correct size for any particular class of work, it is obvious that the pressure exerted by said weight will remain constant during the entire welding operation and will be unaffected by any of the factors which render manual operation of the hand lever uncertain and imperfect. Also, to provide for varying the size of the weight 4 to adapt the machine for different classes of work, said weight is so constructed that the size thereof may be readily varied or one weight substituted for another. As shown, said weight consists of a plurality of sections hung from the end of the cord 5 by means of a hook rod 11, said weight sections being preferably slotted in the manner of the weights commonly used on platform scales, whereby said weight sections may be readily applied to and removed from said hook rod when it is desired to increase or decrease the size or aggregate weight thereof.

The lever 1 is adapted to be relieved from the pressure of the weight 4 by means of a hook 12 pivoted to the bracket 10 and said lever 1 is adapted to be moved pivotally against the force of the weight 4 to provide for engaging the hook 12 therewith, by means of a foot lever 13 pivoted to a floor plate 14, said lever 13 being connected to the pressure lever 12 by means of a cord 15 opposite ends of which are attached to said levers respectively, and which passes over a guide sheave 16 rotatably mounted in proper position on the bracket 10.

The operation of my improved means is as follows:—The parts to be welded are first secured in the electrodes of the machine, the hook 12 is disengaged from the pressure lever 1, thus subjecting said lever 1 to the action of the weight 4 which will operate to force the ends of the pieces to be welded together with a desired welding pressure. The contact operating lever 2 is then manipulated to close the contacts, thus subjecting the parts of the pieces to be welded between the electrodes of the machine to the action of an electric current which will very quickly bring them to a desired welding temperature. As soon as this temperature is reached, the weight 4 will force the ends of the pieces to be welded together, thus completing the weld. Forcing the ends of the pieces to be welded together will cause them to bulge at the point of the weld, thus distorting the pieces which have been welded at the point of weld. This distortion may be removed by pressure applied thereto while the metal is still hot, but this operation has no relation to the present invention.

I claim:—

1. In a welding machine of the type specified, the combination with the pressure lever thereof, of a weight applied thereto adapted for imparting movement thereto to subject the pieces to be welded to a desired welding pressure, means for retracting said pressure lever into inopertaive position against the force of said weight, and means adapted for securing said pressure lever in inoperative position, substantially as described.

2. In a welding machine of the type specified, the combination with the pressure lever thereof, of a weight applied thereto adapted for imparting movement thereto to subject the pieces to be welded to a desired welding pressure, a foot lever, and connection between said foot lever and pressure lever adapted for retracting said pressure lever against the force of said weight, substantially as described.

3. In a welding machine of the type specified, the combination with the pressure lever thereof, of a weight applied thereto adapted for imparting movement thereto to subject the pieces to be welded to a desired welding pressure, a foot lever, and connection between said foot lever and pressure lever adapted for retracting said pressure lever against the force of said weight, and a hook adapted for securing said pressure lever in inoperative position, substantially as described.

In testimony that I claim the foregoing as my invention, I affix my signature this 15th day of September, 1919.

EDWIN M. BASSLER.